United States Patent
Tao et al.

(10) Patent No.: US 8,040,781 B2
(45) Date of Patent: Oct. 18, 2011

(54) WAVELENGTH SELECTING WAVELENGTH PLATE AND OPTICAL HEAD DEVICE USING IT

(75) Inventors: Yukihiro Tao, Fukushima (JP); Hiromasa Sato, Fukushima (JP); Atsushi Koyanagi, Fukushima (JP); Koji Miyasaka, Fukushima (JP)

(73) Assignee: Asahi Glass Company, Limited, Tokyo (JP)

( * ) Notice: Subject to any disclaimer, the term of this patent is extended or adjusted under 35 U.S.C. 154(b) by 29 days.

(21) Appl. No.: 12/497,194

(22) Filed: Jul. 2, 2009

(65) Prior Publication Data

US 2009/0268585 A1 Oct. 29, 2009

Related U.S. Application Data

(63) Continuation of application No. PCT/JP2007/075305, filed on Dec. 28, 2007.

(30) Foreign Application Priority Data

Jan. 5, 2007 (JP) .................................. 2007-000577

(51) Int. Cl.
*G11B 7/135* (2006.01)
*G02B 5/30* (2006.01)

(52) U.S. Cl. ......... 369/112.17; 369/112.02; 359/489.07; 359/489.15; 359/492.01

(58) Field of Classification Search .............. 369/112.16, 369/112.17
See application file for complete search history.

(56) References Cited

U.S. PATENT DOCUMENTS

| 2002/0036728 A1* | 3/2002 | Okumura ........................ 349/61 |
| 2005/0007506 A1* | 1/2005 | Faris et al. ...................... 349/16 |
| 2005/0180296 A1* | 8/2005 | Ooto ........................ 369/112.22 |
| 2005/0274870 A1* | 12/2005 | Katayama .................. 250/201.5 |
| 2006/0239171 A1 | 10/2006 | Ooi et al. |

FOREIGN PATENT DOCUMENTS

| JP | 10293317 A * | 11/1998 |
| JP | 2001-101700 | 4/2001 |
| JP | 2002-40253 | 2/2002 |
| JP | 2002-250815 | 9/2002 |
| JP | 2005-209327 | 8/2005 |
| JP | 2006-236549 | 9/2006 |
| WO | WO 2005064368 A1 * | 7/2005 |

OTHER PUBLICATIONS

English Machine Translation of JP 10-293317 A (Yokoo et al., Optical Rotating Dispersion Element, Nov. 4, 1998).*

* cited by examiner

*Primary Examiner* — Will J Klimowicz
*Assistant Examiner* — Mark Fischer
(74) *Attorney, Agent, or Firm* — Oblon, Spivak, McClelland, Maier & Neustadt, L.L.P.

(57) ABSTRACT

An optical rotating plate has an optical rotating material layer. A phase plate is provided on a first surface side of the optical rotating plate and has at least one birefringent material layer. The first surface side is disposed toward an emitting side of an optical path, thereby giving different phase differences to a first linearly polarized light group containing at least a linearly polarized light having a first wavelength and a second linearly polarized light group containing at least a linearly polarized light having a second wavelength which is different from the first wavelength.

5 Claims, 7 Drawing Sheets

BACKGROUND ART

WAVELENGTH SELECTING WAVELENGTH PLATE AND OPTICAL HEAD DEVICE USING IT

TECHNICAL FIELD

The present invention relates to a wavelength selecting wavelength plate and an optical head device using the same, and more particularly to a wavelength selecting wavelength plate which can be applied to a linearly polarized light having at least two different wavelengths and an optical head device using the same.

BACKGROUND ART

A high density DVD has been practically used in addition to a CD or a DVD as an optical disk capable of writing/reading information through a laser beam. An optical head device applied to write/read information to/from the optical disk is to have an optical characteristic which is adapted to the optical disk. In the case in which an optical device such as a polarization diffracting device or a ¼ wavelength plate is disposed for each of lights having different wavelengths, however, it is impossible to avoid a complicated structure, resulting in a poor economical efficiency.

In order to solve the problem, there has already been proposed a broadband phase plate capable of converting linearly polarized lights having two different wavelengths into circularly polarized lights respectively. The structure has been disclosed in Japanese Laid-Open Patent Publication No. 2001-101700 (Patent Document 1), for example.

A broadband phase plate disclosed in the Patent Document 1 is constituted by two phase plates having different retardation values. The two phase plates are superposed in such a manner that respective slow axes cross each other, and the retardation value of the phase plate on a light source side is greater than that of the phase plate on an optical disk side and a ratio of the retardation values is 1.8 to 2.2.

Figure 7:
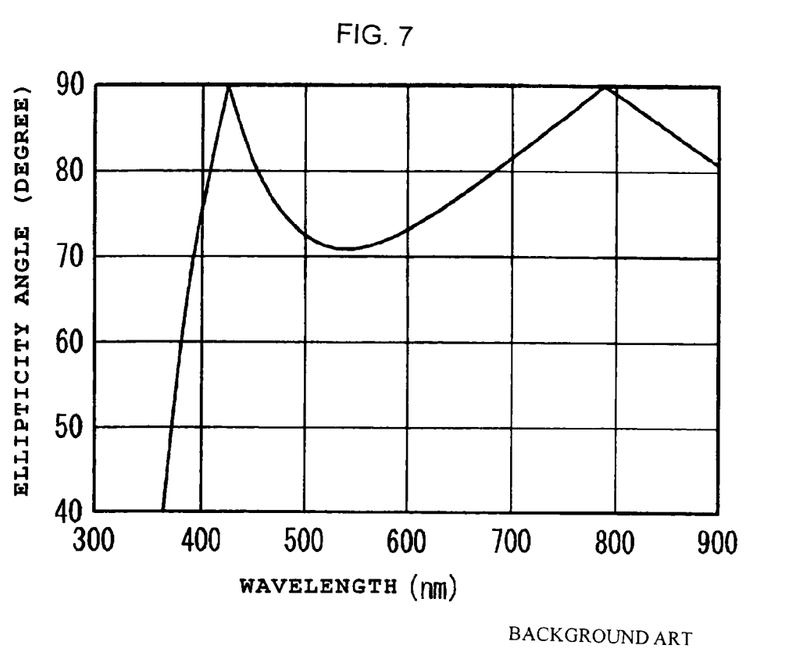
FIG. 7 is a graph showing a wavelength dependency of an ellipticity angle of a light emitted from a conventional phase plate.

FIG. 7 is a graph showing a wavelength dependency (a solid line) of an ellipticity angle of a light emitted from the broadband phase plate which is obtained when angles $\theta_1$ and $\theta_2$ formed by slow axes of the phase plate on the light source side and the phase plate on the optical disk side with respect to a direction of a linearly polarized light of a laser beam which is incident on the broadband phase plate are 71.8 degrees and 18.2 degrees, respectively. As shown in the graph, it is apparent that ellipticity angles of emitted lights having wavelengths of 425 nm and 790 nm are 90 degrees and the broadband phase plate can convert linearly polarized lights having two different wavelengths into circularly polarized lights, respectively.

However, the conventional broadband phase plate has a problem in that linearly polarized lights having two wavelengths can be converted into circularly polarized lights and a proper phase difference cannot be given to a linearly polarized light having a residual one wavelength in an application to three wavelengths. In a two-wavelength compatible optical disk such as a CD or a DVD, moreover, it is hard to convert the linearly polarized light into the circularly polarized light for the light having one of the wavelengths and to exactly transmit the linearly polarized light for the light having the other wavelength.

DISCLOSURE OF THE INVENTION

It is an object of the invention to solve the conventional problems and to provide a wavelength selecting wavelength plate capable of giving a desirable phase difference to linearly polarized lights having at least two wavelengths.

In order to achieve the object, an aspect of the invention is directed to a wavelength selecting wavelength plate including a first optical rotating plate having an optical rotating material layer, and a phase plate provided on a first surface side of the first optical rotating plate and having at least one birefringent material layer, wherein the first surface side is disposed toward an emitting side of an optical path to give different phase differences to a first linearly polarized light group containing at least a linearly polarized light having a wavelength $\lambda_1$ and a second linearly polarized light group containing at least a linearly polarized light having a wavelength $\lambda_2$ which is different from the wavelength $\lambda_1$.

By the structure, it is possible to give desirable phase differences to the linearly polarized lights having at least two wavelengths.

It is also possible to employ a structure in which the first optical rotating plate converts a polarizing direction of the first linearly polarized light group into a polarizing direction in which a conversion into a circularly polarized light is carried out by the phase plate and converts a polarizing direction of the second linearly polarized light group into a polarizing direction in which a phase difference is not given by the phase plate.

By the structure, it is possible to convert a part of the linearly polarized lights having at least two wavelengths into circularly polarized lights.

It is also possible to employ a structure in which the phase plate includes two birefringent material layers formed such that their respective slow axes cross each other to form a predetermined angle, and a first retardation value of the birefringent material layer on a close side to the first surface is greater than a second retardation value of the birefringent material layer on a distant side from the first surface and a ratio of the first retardation value to the second retardation value is 1.8 to 2.2.

By the structure, the first linearly polarized light group containing the linearly polarized light having the wavelength $\lambda_1$ can be converted into almost circularly polarized lights and the second linearly polarized light group containing the linearly polarized light having the wavelength $\lambda_2$ which is different from the wavelength $\lambda_1$ can be converted into linearly polarized lights.

The phase plate may have a structure in which the slow axes of the two birefringent material layers cross each other to form an angle of 45 to 75 degrees.

By the structure, it is possible to reduce a wavelength dependency of an ellipticity of the circularly polarized light which is emitted.

It is also possible to employ a structure in which a second optical rotating plate having an optical rotating material layer is provided, and the phase plate has a second surface on the close side to the first surface and a third surface on the distant side from the first surface, and the second optical rotating plate is provided opposite to the third surface.

By the structure, it is possible to control a polarizing direction of the linearly polarized light which is emitted.

It is also possible to have a structure in which the optical rotating material layer of the optical rotating plate is formed by a cholesteric liquid crystal and the birefringent material layer of the phase plate is formed by a resin having a birefringent property.

An aspect of the invention is directed to an optical head device including at least one light source for emitting lights having different wavelengths, an objective lens for collecting the lights emitted from the light source onto an optical recording medium, and a photodetector for detecting a light reflected by the optical recording medium, wherein the wavelength selecting wavelength plate is disposed in an optical path between the light source and the objective lens.

According to the invention, therefore, it is possible to provide the wavelength selecting wavelength plate having an advantage that a desirable phase difference can be given to linearly polarized lights having at least two wavelengths by using the optical rotating plate, and the optical head device using the same.

BEST MODE FOR CARRYING OUT THE INVENTION

An embodiment of a wavelength selecting wavelength plate according to the invention will be described below in detail with reference to the accompanying drawings.

In the specification, it is assumed that "a wavelength selecting wavelength plate (or a phase plate) functions as a ¼ wave plate" implies that a retardation value of the wavelength selecting wavelength plate (or the phase plate) is $\lambda/4+m\lambda$ (m is a natural number including zero).

First Embodiment

Figure 1:
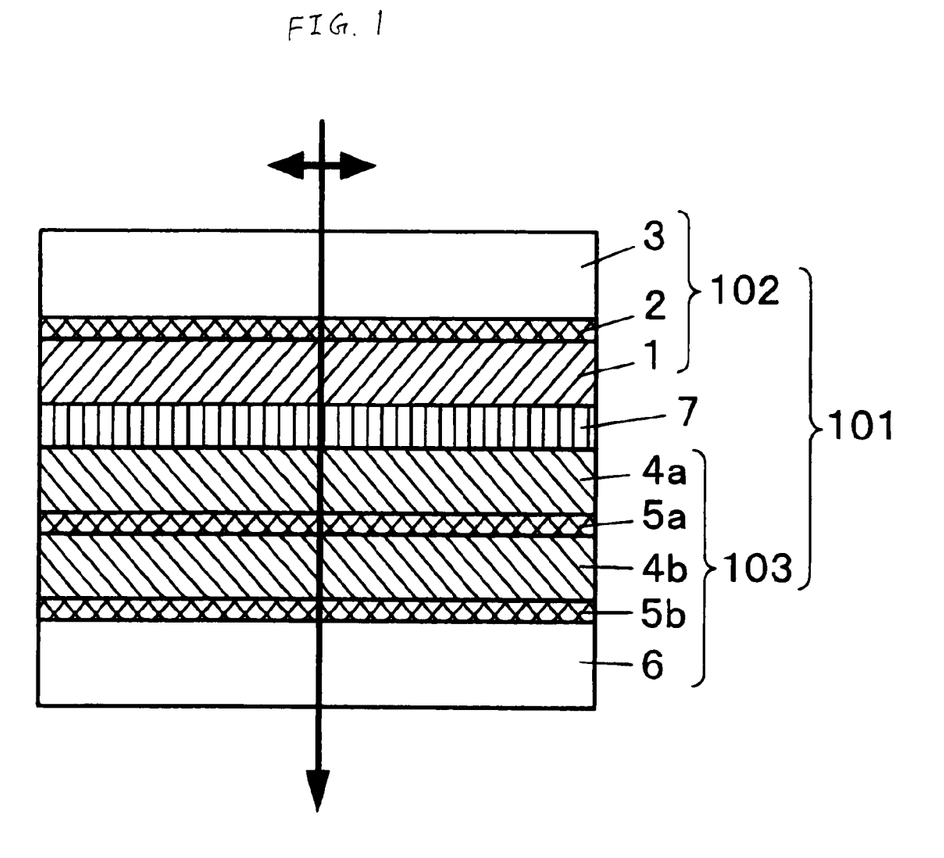
FIG. 1 is a sectional view showing a first embodiment of a wavelength selecting wavelength plate according to the invention.

FIG. 1 is a sectional view showing a first embodiment of the wavelength selecting wavelength plate according to the invention. More specifically, a wavelength selecting wavelength plate 101 includes an optical rotating plate 102 having an optical rotating material layer and a phase plate 103 laminated on an emitting side of the optical rotating plate 102 and having at least one birefringent material layer, and gives different phase differences to a first linearly polarized light group containing at least a linearly polarized light having a wavelength $\lambda_1$ and a second linearly polarized light group containing at least a linearly polarized light having a wavelength $\lambda_2$ which is different from the wavelength $\lambda_1$.

The optical rotating plate 102 serves to convert a polarizing direction of the first linearly polarized light group into a polarizing direction in which a conversion into a circularly polarized light is carried out by the phase plate 103 and to convert a polarizing direction of the second linearly polarized light group into a polarizing direction in which a phase difference is not given by the phase plate 103.

The phase plate 103 includes two birefringent material layers formed to such that respective slow axes to cross each other to form a predetermined angle, and a retardation value $R_1$ of the birefringent material layer on an incident side is greater than a retardation value $R_2$ of the birefringent material layer on an emitting side and a ratio of the retardation value $R_1$ to the retardation value $R_2$ is 1.8 to 2.2. The slow axes of the two double diffracting material layers cross to form an angle of 45 to 75 degrees.

The optical rotating plate 102 and the phase plate 103 may be laminated on a transparent substrate. In that case, one transparent substrate may be provided, and over two transparent substrates may be provided. By laminating the transparent substrate, it is possible to produce such an advantage as to improve a deformation of the optical rotating plate 102 and the phase plate 103 which is caused by a thermal expansion or a wave aberration of a transmitted light. Moreover, a transmittance can be enhanced through an antireflection treatment over the transparent substrate, which is practically preferable.

Figure 2A:
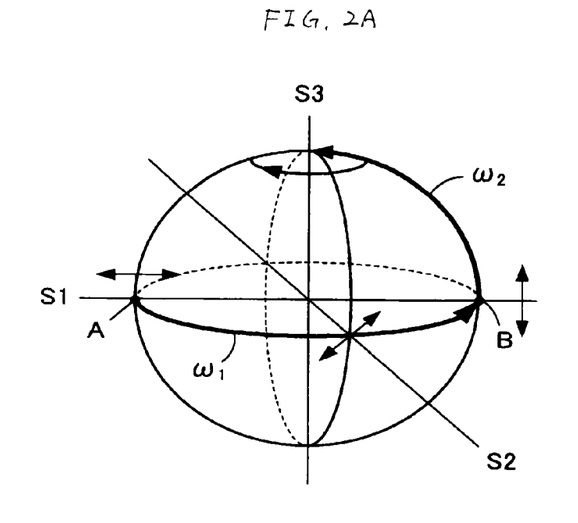
FIGS. 2A to 2C are schematic views showing a Poincare sphere indicative of a polarizing state, slow axis directions of a phase plate and a polarizing direction of a linearly polarized light.
Figure 2B:
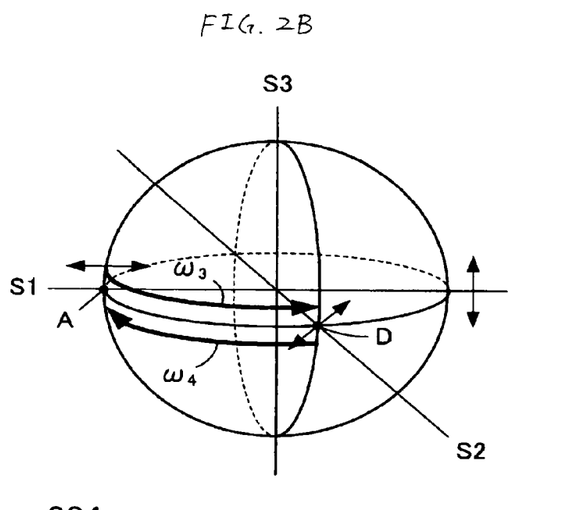
Figure 2C:
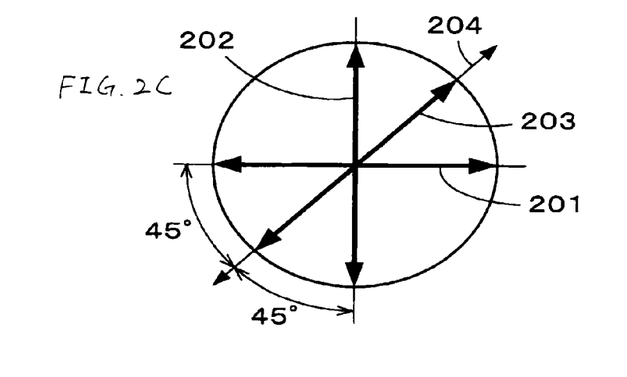

An operation principle of the wavelength selecting wavelength plate 101 according to the embodiment will be described with reference to schematic views showing slow axis directions of a Poincare sphere indicative of a polarizing state illustrated in FIGS. 2A and 2B and a phase plate illustrated in FIG. 2C and a polarizing direction of a linearly polarized light. Herein, it is assumed that the optical rotating plate serves to optically rotate the first linearly polarized light group containing the linearly polarized light having the wavelength $\lambda_1$ by 90 degrees and the second linearly polarized light group containing the linearly polarized light having the wavelength $\lambda_2$ by 45 degrees and the phase plate functions as a ¼ wave plate.

The polarizing direction of the first linearly polarized light group which is incident on the optical rotating plate is set to be a direction of 201 (an A point in FIG. 2A) and a polarizing direction of the first linearly polarized light group transmitted through the optical rotating plate is set to be a direction of 202 (a B point in FIG. 2A) which is rotated by 180 degrees (an arrow $\omega_1$) around an $S_3$ axis over the Poincare sphere. The polarizing direction 202 forms an angle of 45 degrees with respect to a slow axis direction 204 of the phase plate. Therefore, the first linearly polarized light group on the B point is transmitted through the phase plate, and is thus moved to a point rotated by 90 degrees (shown by arrow $\omega_2$) around an $S_2$ axis over the Poincare sphere and is changed into a circularly polarized light.

On the other hand, the polarizing direction of the second linearly polarized light group incident on the optical rotating plate is set to be the direction of 201 (an A point in FIG. 2B) and a polarizing direction of the second linearly polarized light group transmitted through the optical rotating plate is set to be a direction of 203 (a D point in FIG. 2B) which is rotated by 90 degrees (an arrow $\omega_3$) around the $S_3$ axis over the Poincare sphere. Since the polarizing direction 203 is identical to the slow axis direction 204 of the phase plate, a polarizing state of the second linearly polarized light group on the D point is not changed irrespective of the transmission through the phase plate.

Accordingly, it is apparent that the wavelength selecting wavelength plate 101 substantially converts the first linearly polarized light group into the circularly polarized light and the second linearly polarized light group is transmitted as a linearly polarized light having the polarizing direction changed.

Structures and functions of the optical rotating plate 102 and the phase plate 103 which constitute the wavelength selecting wavelength plate 101 according to the embodiment will be described by taking, as an example, the case in which linearly polarized lights having wavelengths of 400 nm and 785 nm are contained in the first linearly polarized light group and a linearly polarized light having a wavelength of 660 nm is contained in the second linearly polarized light group.

The optical rotating plate 102 includes an optical rotating material layer 1 having a predetermined optical rotating property corresponding to a wavelength of a linearly polarized light which is incident, an alignment film 2 of the optical rotating material layer 1, and a transparent substrate 3 on which the alignment film 2 is formed. For a material of the optical rotating material layer 1, it is preferable to use a polymeric cholesteric liquid crystal in respect of an easiness of an availability and a fabrication.

The phase plate 103 bonded to the optical rotating plate 102 through a bonding layer 7 is formed by two birefringent material layers, and includes a polymer liquid crystal layer 4a, which constitute a birefringent material layer on an incident side, and an alignment film 5a for the polymer liquid crystal layer, a polymer liquid crystal layer 4b which constitute a birefringent material layer on an emitting side, an alignment film 5b for the polymer liquid crystal layer, and a transparent substrate 6 on which the alignment film 5b is formed, the phase plate 103 functioning as a ¼ wave plate for the linearly polarized lights having the wavelength of 400 nm and the wavelength of 785 nm.

The phase plate 103 has a birefringent property and preferably functions as a wave plate for a necessary wavelength range. For a material of a birefringent material layer of the phase plate 103, it is preferable to use a crystal a resin formed of polycarbonate etc. and having the birefringent property, a polymer liquid crystal and a complex thereof in respect of an easiness of an availability and a fabrication.

For the transparent substrates 3 and 6, it is preferable to use a glass substrate or a plastic substrate formed of polyethylene terephthalate or polycarbonate. For the alignment films 2, 5a and 5b, moreover, it is preferable to use a polymer film such as a polyimide film.

Figure 3:
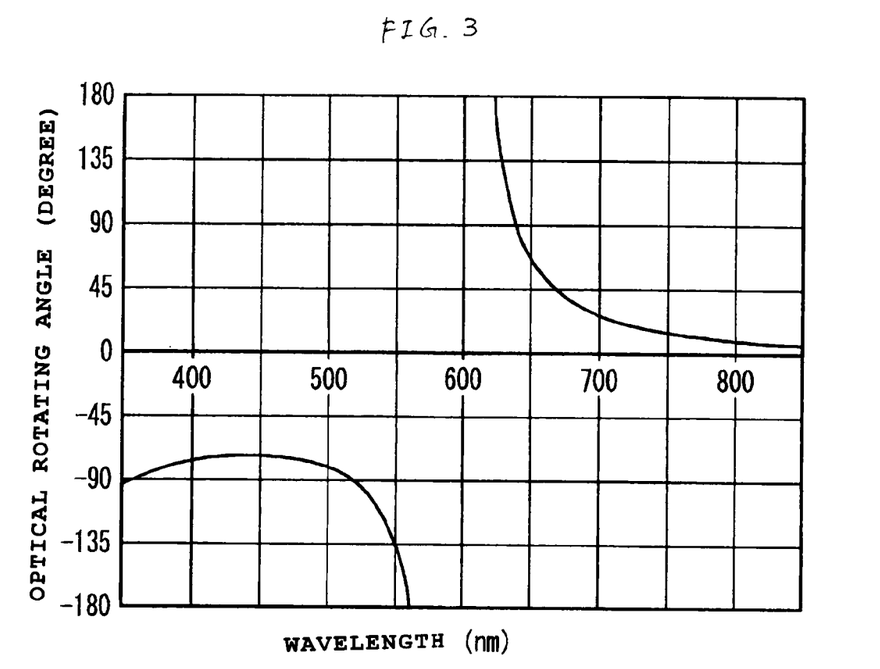
FIG. 3 is a graph showing a wavelength dependency of an optical rotating angle of an optical rotating plate.

FIG. 3 is a graph showing a wavelength dependency of an optical rotating angle of the optical rotating plate 102 constituted by a cholesteric liquid crystal according to the embodiment, and it is apparent that an optical rotatory dispersion becomes abnormal in the vicinity of a waveband causing a selective reflection and a sign of the optical rotating angle is reversed. Thus, the optical rotating plate 102 has a characteristic that an optical rotatory power is varied depending on a wavelength of an incident light. For example, when the linearly polarized lights having the wavelengths of 400 nm, 660 nm and 785 nm are incident on the optical rotating plate 102, the optical rotating angle is 45 degrees for the wavelength of 660 nm and 90 degrees for the wavelength of 785 nm with an azimuth of an emitted light having the wavelength of 400 nm set to be a reference (zero degree).

Figure 4:
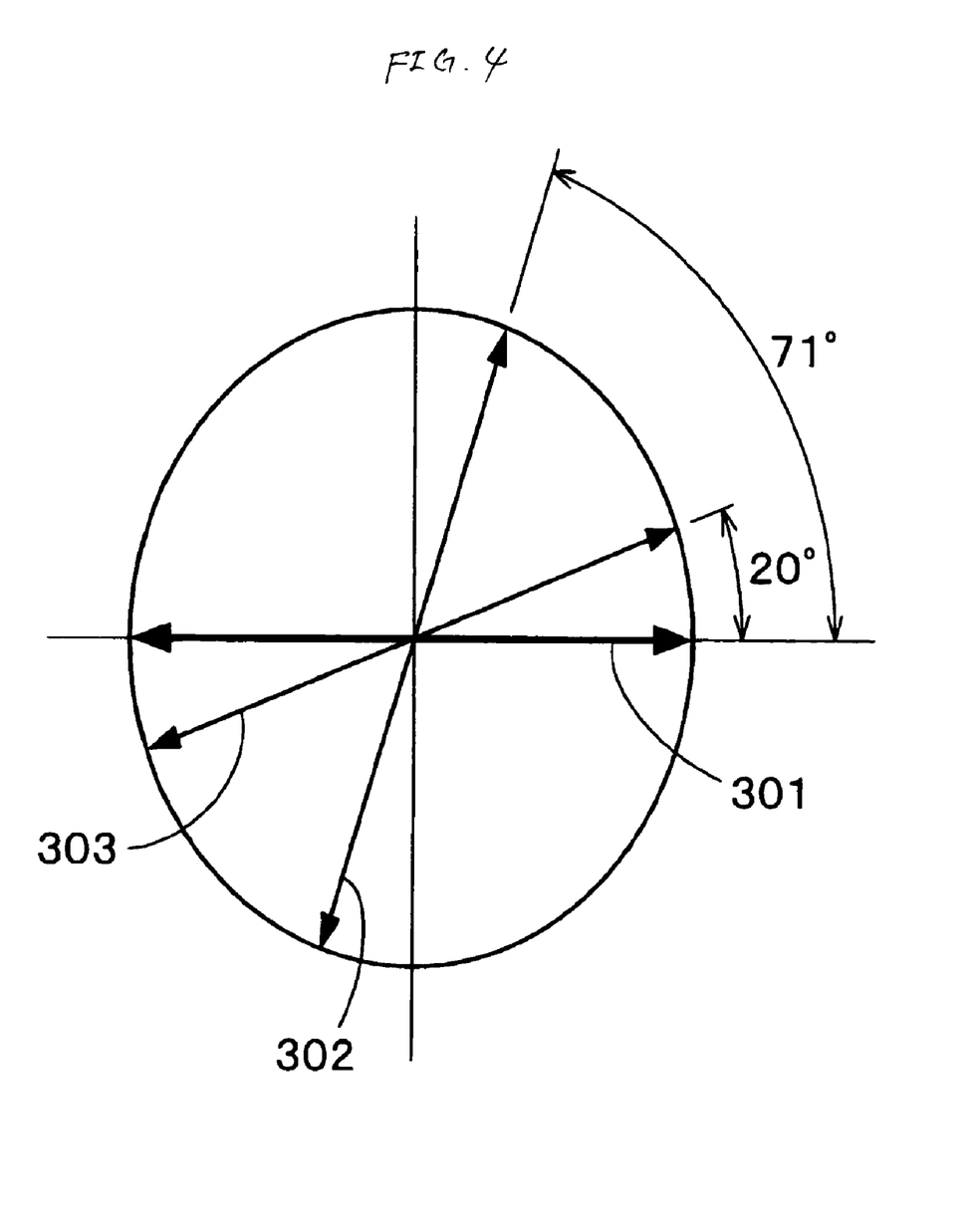
FIG. 4 is a schematic view showing, in detail, a slow axis direction of a phase plate and a polarizing direction of a linearly polarized light which is incident.

FIG. 4 is a schematic view showing, in detail, a slow axis direction of the phase plate 103 and a polarizing direction of a linearly polarized light which is incident. For a polarizing direction 301 of the linearly polarized light, a slow axis direction 302 of the polymer liquid crystal layer 4a constituting the birefringent material layer on the incident side forms an angle of 71 degrees and a slow axis direction 303 of the polymer liquid crystal layer 4b constituting the birefringent material layer on the emitting side forms an angle of 20 degrees. At this time, it is apparent that emitted lights have ellipticities of 0.9 or more, approximately 0.8, and 0.9 or more respectively when linearly polarized lights having wavelengths of 400 nm, 660 nm and 785 nm are incident on the phase plate 103, and the phase plate 103 functions as the ¼ wave plate for the linearly polarized lights having the wavelengths of 400 nm and 785 nm.

Also in the case in which the slow axis direction 302 of the polymer liquid crystal layer 4a constituting the birefringent material layer on the incident side forms an angle of 20 degrees and the slow axis direction 303 of the polymer liquid crystal layer 4b constituting the birefringent material layer on the emitting side forms an angle of 71 degrees for the polarizing direction 301 of the linearly polarized light incident on the phase plate 103, the same advantages can be obtained. It is sufficient that the angles of 71 degrees and 20 degrees have values within a range of approximately ±10 degrees respectively and the slow axis directions 302 and 303 form angles of 45 to 75 degrees each other.

The function of the wavelength selecting wavelength plate 101 according to the embodiment will be described by taking, as an example, the case in which the linearly polarized lights having the wavelengths of 400 nm and 785 nm are included in the first linearly polarized light group and the linearly polarized light having the wavelength of 660 nm is included in the second linearly polarized light group. The linearly polarized lights having the wavelengths of 400 nm, 660 nm and 785 nm are incident from the optical rotating plate 102 side of the wavelength selecting wavelength plate 101. A polarizing direction in the incidence on the optical rotating plate 102 is set to be almost the same as the slow axis direction 302 of the polymer liquid crystal layer 4a of the phase plate 103 so that the linearly polarized light having the wavelength of 400 nm receives an optical rotation of −70 degrees through the optical rotating plate 102 and the polarizing direction in the incidence on the phase plate 103 is thus set to be the direction of 301. At this time, the polarizing direction in the incidence, on the phase plate 103, of the linearly polarized light having the wavelength of 785 nm is set to be a direction which forms an angle of 90 degrees with respect to 301. Similarly, the polarizing direction in the incidence, on the phase plate 103, of the linearly polarized light having the wavelength of 660 nm forms an angle of 45 degrees with respect to the direction of 301.

More specifically, the first linearly polarized light group is incident on the phase plate 103 in a polarizing direction in which a conversion into a circularly polarized light is carried out through the phase plate 103, and the second linearly polarized light group is incident on the phase plate 103 in a polarizing direction in which a phase difference is not substantially given by the phase plate 103. Thus, the ellipticities of the emitted lights having the wavelengths of 400 nm, 660 nm and 785 nm are 0.9 or more, 0.1 or less, and 0.9 or more, respectively. Accordingly, the wavelength selecting wavelength plate 101 has a practically sufficient characteristic as a ¼ wave plate for the linearly polarized lights having the wavelengths of 400 nm and 785 nm and a wave plate for a transmission as a linearly polarized light for the linearly polarized light having the wavelength of 660 nm. An optical rotating angle of the emitted light of the linearly polarized light having the wavelength of 660 nm is 10 degrees with respect to the slow axis direction 303 of the polymer liquid crystal layer 4b.

As described above, the wavelength selecting wavelength plate according to the embodiment has the optical rotating plate on the incident side of the phase plate. Consequently, it is possible to convert the first linearly polarized light group into the circularly polarized light and to transmit the second linearly polarized light group as the linearly polarized light.

Second Embodiment

Figure 5:
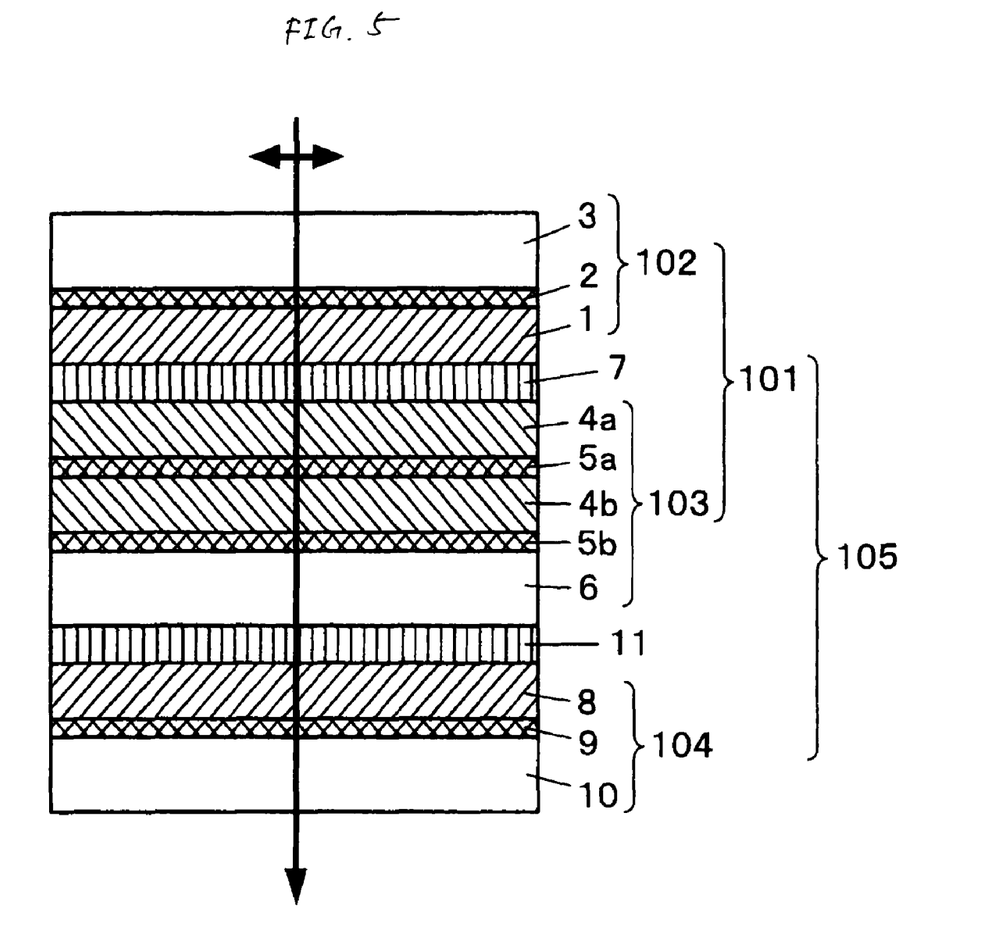
FIG. 5 is a sectional view showing a second embodiment of the wavelength selecting wavelength plate according to the invention.

FIG. 5 is a sectional view showing a second embodiment of the wavelength selecting wavelength plate according to the invention. More specifically, a wavelength selecting wavelength plate 105 according to the second embodiment includes the wavelength selecting wavelength plate 101 according to the first embodiment and an optical rotating plate 104 laminated on the emitting side of the wavelength selecting wavelength plate 101 through a bonding layer 11. The optical rotating plate 104 includes an optical rotating material layer 8 having an optical rotating direction which is reverse to that of an optical rotating material layer 1 of an optical rotating plate 102, an alignment film 9 of the optical rotating material layer 8, and a transparent substrate 10 on which the alignment film 9 is formed.

An operation principle of the wavelength selecting wavelength plate 105 according to the embodiment will be described with reference to a schematic view showing the slow axis directions of the Poincare sphere illustrated in FIG. 2B and the phase plate illustrated in FIG. 2C and the polarizing direction of the linearly polarized light. Since a function of the wavelength selecting wavelength plate 105 for a first linearly polarized light group including a linearly polarized light having a wavelength $\lambda_1$ is the same as the wavelength selecting wavelength plate 101 according to the first embodiment, description will be omitted. It is assumed that the optical rotating plate serves to rotate a second linearly polarized light group including a linearly polarized light having a wavelength $\lambda_2$ by 45 degrees and the phase plate functions as a ¼ wavelength plate.

In the same manner as in the wavelength selecting wavelength plate 101 according to the first embodiment, the polarizing direction of the second linearly polarized light group incident on the optical rotating plate is set to be a direction of 201 (an A point in FIG. 2B) and a polarizing direction of the second linearly polarized light group transmitted through the optical rotating plate on an incident side is set to be a direction of 203 (a D point in FIG. 2B) which is rotated by 90 degrees (an arrow $\omega_3$) around an $S_3$ axis over the Poincare sphere. Since the polarizing direction 203 is identical to a slow axis direction 204 of the phase plate, a polarizing state of the second linearly polarized light group on the D point is not changed irrespective of a transmission through the phase plate.

The second linearly polarized light group on the D point which is transmitted through the phase plate is incident on an optical rotating plate at an emitting side, is rotated by 90 degrees (an arrow $\omega_4$) around the $S_3$ axis over the Poincare sphere and is changed into a linearly polarized light (the A point in FIG. 2B) in the same polarizing direction as the polarizing direction 201 of the linearly polarized light in an incidence on the wavelength selecting wavelength plate.

By setting an optical rotating angle of the optical rotating plate on the emitting side to be an optional angle, it is also possible to set a polarizing direction of a light emitted from the wavelength selecting wavelength plate into an optional direction.

The function of the wavelength selecting wavelength plate 105 according to the embodiment will be described by taking, as an example, the case in which linearly polarized lights having wavelengths of 400 nm and 785 nm are included in the first linearly polarized light group and a linearly polarized light having a wavelength of 660 nm is included in the second linearly polarized light group. Description of the same function as that of the first embodiment will be omitted.

In the same manner as the wavelength selecting wavelength plate 101 according to the first embodiment, the wavelength selecting wavelength plate 105 converts the linearly polarized lights having the wavelengths of 400 nm, 660 nm and 785 nm into emitted lights having ellipticities of 0.9 or more, 0.1 or less and 0.9 or more, respectively. Although the polarizing direction of the emitted light of the linearly polarized light having the wavelength of 660 nm forms 10 degrees with respect to the slow axis direction 303 of the polymer liquid crystal layer 4b in the first embodiment, it is possible to optionally set the polarizing direction of the emitted light by setting an optical rotating angle of the optical rotating plate 104 to be an optional angle in the embodiment. For example, it is preferable that the polarizing direction of the emitted light should be set to be identical to a polarizing direction in an incidence on the wavelength selecting wavelength plate 105.

Accordingly, the wavelength selecting wavelength plate 101 has a practically sufficient characteristic as a ¼ wave plate for the linearly polarized lights having the wavelengths of 400 nm and 785 nm and a wave plate for a transmission as a linearly polarized light in an optional polarizing direction for the linearly polarized light having the wavelength of 660 nm. It is also possible to use a wavelength selecting wavelength plate in which the wavelength selecting wavelength plate 105 according to the embodiment and the wavelength selecting wavelength plate 101 according to the first embodiment are laminated on each other in plural layers.

As described above, the wavelength selecting wavelength plate according to the embodiment has the optical rotating plate on the incident side of the phase plate. Consequently, it is possible to convert the first linearly polarized light group into the circularly polarized light and to convert the second linearly polarized light group into the linearly polarized light in the optional polarizing direction.

Figure 6:
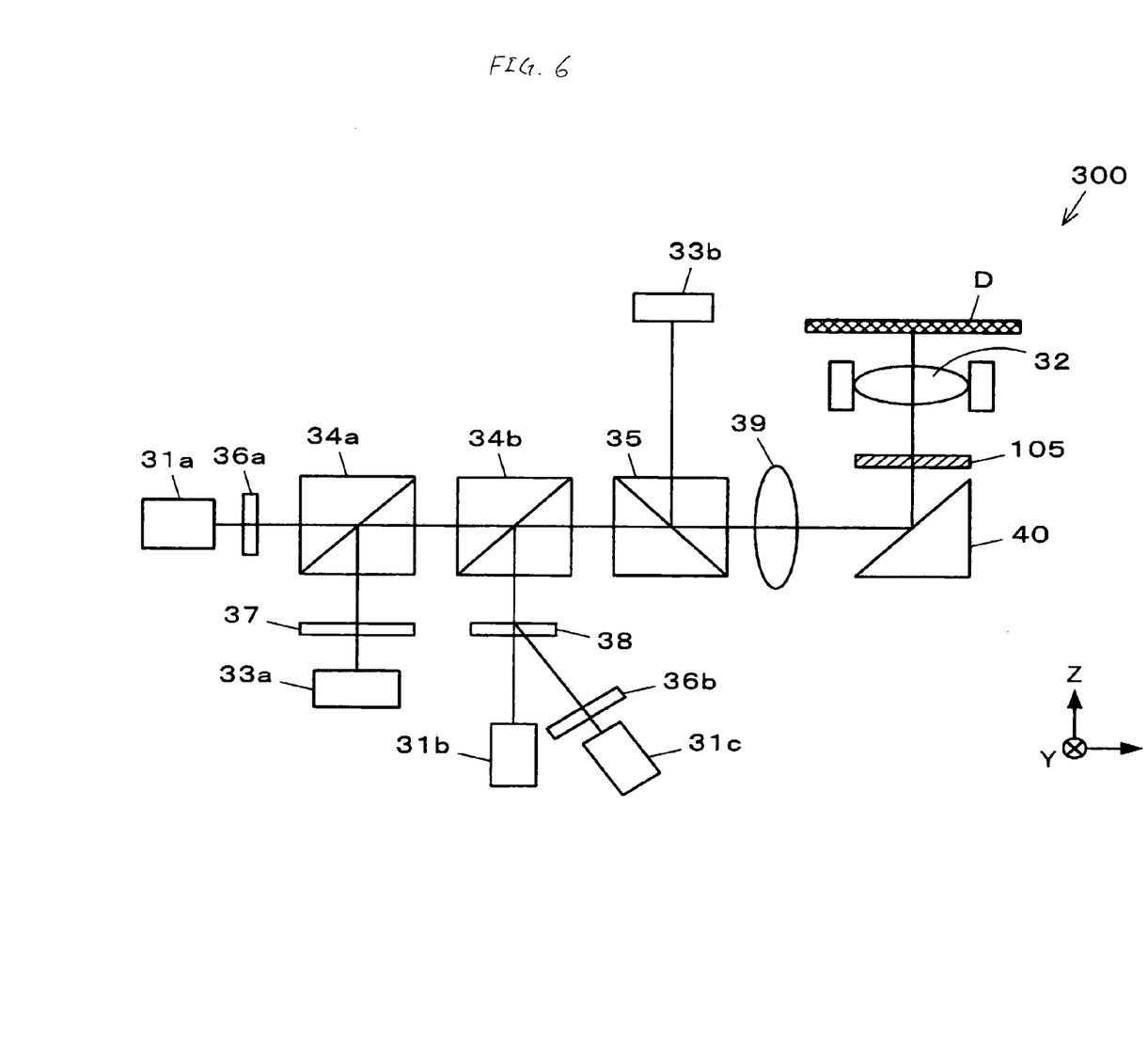
FIG. 6 is a block diagram showing a structure of an optical head device provided with the wavelength selecting wavelength plate according to the invention.

FIG. 6 is a block diagram showing an example of a structure of an optical head device 300 provided with the wavelength selecting wavelength plate 105 according to the embodiment. More specifically, the optical head device 300 includes three light sources 31a, 31b and 31c for emitting linearly polarized lights (400 nm, 660 nm and 785 nm) having different wavelengths, an objective lens 32 for collecting lights emitted from the light sources 31a, 31b and 31c onto the optical recording medium D, and photodetectors 33a and 33b for detecting a light reflected by the optical recording medium D and has a structure in which the wavelength selecting wavelength plate 105 is disposed in an optical path between the light sources 31a, 31b and 31c and the objective lens 32.

The optical head device 300 includes a beam splitter 34a for transmitting the linearly polarized light having the wavelength of 400 nm and reflecting the linearly polarized light having the wavelength of 660 nm, a beam splitter 34b for transmitting the linearly polarized light having the wavelength of 400 nm, reflecting the linearly polarized light having the wavelength of 785 nm and functioning as a half mirror for the linearly polarized light having the wavelength of 660 nm, and a polarizing beam splitter 35 for transmitting a linear polarized light having a vibration plane on an X-Z plane and reflecting a linearly polarized light having a vibration plane on an X-Y plane. The linearly polarized light having the wavelength of 660 nm which is reflected by the beam splitter 34a is incident on the photodetector 33a and the linearly polarized lights having the wavelengths of 400 nm and 785 nm which are reflected by the polarizing beam splitter 35 are incident on the photodetector 33b.

Diffraction gratings 36a and 36b for applying a three-beam method are disposed before the light sources 31a and 31c, respectively. Moreover, an optical axis correcting element 38 for causing a light emitted from the light source 31*b* to be incident on the beam splitter 34*b* at a proper angle is provided on an emitting side of the diffraction grating 36*b*.

Furthermore, the optical head device 300 includes a collimate lens 39 for changing a light emitted from the polarizing beam splitter 35 into a parallel light, and a mirror 40 for changing advancing directions of the linearly polarized lights having three wavelengths which are emitted from the collimate lens 39.

More specifically, the linearly polarized light having the wavelength of 400 nm which is emitted from the light source 31*a* and has a vibration plane on the X-Z plane is incident on the diffraction grating 36*a* and is then separated into a zero-order diffracted light to be a main beam and a ± one-order diffracted light to be a sub beam. The light emitted from the diffracting grating 36*a* is transmitted through the beam splitters 34*a* and 34*b* and the polarizing beam splitter 35 and is made parallel by means of the collimate lens 39, and is incident on the wavelength selecting wavelength plate 105 according to the invention through the mirror 40. The linearly polarized light is converted into a circularly polarized light in a clockwise direction by the wavelength selecting wavelength plate 105 and the circularly polarized light is collected onto an information recording plane of an optical recording medium D by means of the objective lens 32. A return light which is reflected by the information recording plane and is changed into a circularly polarized light in a counterclockwise direction is transmitted through the objective lens 32 and the wavelength selecting wavelength plate 105 and is changed into a linearly polarized light having a vibration plane on the X-Y plane, and is made parallel by means of the collimate lens 39 through the mirror 40. The return light emitted from the collimate lens 39 is reflected by the polarizing beam splitter 35 and is detected through the photodetector 33*b*.

Moreover, the linearly polarized light having the wavelength of 785 nm which is emitted from the light source 31*c* and has a vibration plane on the X-Z plane is incident on the diffraction grating 36*b* and is then separated into a zero-order diffracted light to be a main beam and a ± one-order diffracted light to be a sub beam. The light emitted from the diffraction grating 36*b* is transmitted through the optical axis correcting element 38 and is incident on the beam splitter 34*b* at a proper angle, and is reflected by the beam splitter 34*b* and is thereafter detected by the photodetector 33*b* after the same process as that in case of a light emitted through the light source 31*a*.

On the other hand, the linearly polarized light having the wavelength of 660 nm which is emitted from the light source 31*b* and has a vibration plane on the X-Z plane is reflected by the beam splitter 34*b* and is incident on the wavelength selecting wavelength plate 105 according to the invention through the polarizing beam splitter 35, the collimate lens 39 and the mirror 40. The wavelength selecting wavelength plate 105 transmits the linearly polarized light having the wavelength of 660 nm with the polarizing state maintained. The light emitted from the wavelength selecting wavelength plate 105 is collected onto the information recording plane of the optical recording medium D by means of the objective lens 32. The return light reflected by the information recording plane is transmitted through the objective lens 32 and the wavelength selecting wavelength plate 105 and is made parallel as a linearly polarized light having a vibration plane on the X-Z plane by means of the collimate lens 39 through the mirror 40. The return light emitted from the collimate lens 39 is transmitted through the polarizing beam splitter 35 and is partially reflected by the beam splitter 34*b*. A part of the return light transmitted without a reflection through the beam splitter 34*b* is reflected by the beam splitter 34*a*, and is detected by the photodetector 33*a* through a holographic optical element 37.

As described above, the optical head device can give a desirable phase difference to the linearly polarized lights having the three wavelengths by using the wavelength selecting wavelength plate according to the invention. The wavelength selecting wavelength plate 105 may be replaced with the wavelength selecting wavelength plate 101 according to the first embodiment.

Description will be given to a specific example based on the embodiment according to the invention.

Example 1

An example of the wavelength selecting wavelength plate 101 according to the invention will be described with reference to FIGS. 1 and 4. There is fabricated a wave plate which functions as a ¼ wave plate for linearly polarized lights having wavelengths of 400 nm and 785 nm and serves to transmit a linearly polarized light having a wavelength of 660 nm with the polarizing state maintained.

First of all, there is fabricated the phase plate 103 functioning as the ¼ wave plate for the linearly polarized light having the wavelength of 400 nm and the linearly polarized light having the wavelength of 785

(1) There is prepared the transparent substrate 6 to be a glass substrate having a thickness of 0.5 mm. A polyimide film is formed on a surface at an incident side of the transparent substrate 6. An upper surface of the polyimide film is rubbed in the direction of 303 in FIG. 4 to give a horizontal alignment function to the polyimide film, thereby forming the alignment film 5*b*. Then, beads formed of $SiO_2$ and having a diameter of 6.7 μm which are not shown are sprayed on the alignment film 5*b* at a density of 5000 pieces/$cm^2$. The beads serve to hold a gap of a liquid crystal cell.

(2) There is prepared a glass substrate having the same polyimide alignment film (not shown) as the transparent substrate 6 on which the alignment film 5*b* is formed. The polyimide alignment film of the glass substrate having the polyimide alignment film is subjected to a mold releasing treatment. Furthermore, a thermosetting type epoxy sealing material which is not shown is printed on an outer peripheral portion of the glass substrate having the polyimide alignment film. The transparent substrate 6 and the glass substrate having the polyimide alignment film which is subjected to the mold releasing treatment are opposed to each other and are fixed through the epoxy sealing material to form a liquid crystal cell having a gap of 6.7 μm between two glass substrates.

(3) There is injected, into the liquid crystal cell, a liquid crystal material having a difference Δn between an ordinary refractive index and an extraordinary refractive index which is approximately 0.042 with respect to a light having a wavelength of 400 nm, is approximately 0.035 with respect to a light having a wavelength of 660 nm and is approximately 0.034 with respect to a light having a wavelength of 785 nm. The liquid crystal material is a UV curing liquid crystalline monomer composition having 1% of benzoylisopropyl ether added as a photopolymerization initiator.

(4) A UV light having a wavelength of 365 nm is irradiated on the whole liquid crystal material and the whole liquid crystalline monomer composition is polymerized and solidified in a horizontal alignment state. A heat treatment is carried out for 30 minutes at 140° C. to form the polymer liquid crystal layer 4*b* which has a thickness of 6.7 μm and is horizontally aligned. Then, the glass substrate subjected to the mold releasing treatment is removed.

(5) A polyimide film is formed on the polymer liquid crystal layer 4b and an upper surface of the polyimide film is rubbed in the direction of 302 in FIG. 4 to give a horizontal alignment function to the polyimide film, thereby forming the alignment film 5a. Furthermore, beads formed of $SiO_2$ and having a diameter of 3.3 μm which are not shown are sprayed on the alignment film 5a at a density of 5000 pieces/cm$^2$.

(6) By the same procedure as (2) to (4), the polymer liquid crystal layer 4a which has a thickness of 3.3 μm and is horizontally aligned is formed. Through the steps (1) to (6), the phase plate 103 is finished.

Furthermore, the optical rotating plate 102 is formed in the following manner.

(1) There is prepared the transparent substrate 3 to be a glass substrate having a thickness of 0.5 mm. A polyimide film is formed on a surface at an emitting side of the transparent substrate 6 and an upper surface of the polyimide film is rubbed to give a horizontal alignment function to the polyimide film, thereby forming the alignment film 2. Furthermore, beads formed of $SiO_2$ and having a diameter of 32 μm which are not shown are sprayed on the alignment film 2 at a density of 5000 pieces/cm$^2$.

(2) There is prepared a glass substrate having the same polyimide alignment film (not shown) as the transparent substrate 3 on which the alignment film 2 is formed. The polyimide alignment film of the glass substrate having the polyimide alignment film is subjected to a mold releasing treatment. Furthermore, a thermosetting type epoxy sealing material which is not shown is printed on an outer peripheral portion of the glass substrate having the polyimide alignment film. The transparent substrate 3 and the glass substrate having the polyimide alignment film which is subjected to the mold releasing treatment are opposed to each other and are fixed through the epoxy sealing material to form a liquid crystal cell having a gap of 32 μm between two glass substrates.

(3) There is injected, into the liquid crystal cell, a liquefied cholesteric liquid crystal material having a difference Δn between an ordinary refractive index and an extraordinary refractive index which is approximately 0.112 with respect to a light having a wavelength of 400 nm, is approximately 0.105 with respect to a light having a wavelength of 660 nm and is approximately 0.103 with respect to a light having a wavelength of 785 nm, and having a cholesteric pitch of 370 nm. The cholesteric liquid crystal material is a UV curing liquid crystalline monomer composition having 1% of benzoylisopropyl ether added as a photopolymerization initiator.

(4) A UV light having a wavelength of 365 nm is irradiated on the whole liquid crystal material and the whole liquid crystalline monomer composition is polymerized and solidified in a horizontal alignment state. A heat treatment is carried out for 30 minutes at 140° C. to form the optical rotating material layer 1 which has a thickness of 32 μm and is horizontally aligned. Then, the glass substrate subjected to the mold releasing treatment is removed so that the optical rotating plate 102 is finished.

(5) A UV adhesive is dropped onto the phase plate 103 to carry out a rotation for 20 seconds at a rotating speed of 1000 rpm and 100 seconds at a rotating speed of 5000 rpm, thereby setting a thickness of a UV adhesive layer to be 5 μm. After the optical rotating plate 102 is laminated, a UV light of 5000 mJ is irradiated on the UV adhesive layer and the UV adhesive layer is thus cured into the bonding layer 7 so that the wavelength selecting wavelength plate 101 is finished.

Finally, a rubbing direction of the optical rotating plate 102 is set to be a reference and the wavelength selecting wavelength plate 101 is thus cut into an external shape of 5 mm×5 mm by using a dicing saw to obtain a shape which can be applied to an optical head device. Moreover, a transmitting wave front aberration of the wavelength selecting wavelength plate 101 after cutting is equal to or smaller than 25 mλrms as a result of a measurement using an He—Ne laser having a wavelength of 633 nm and it is apparent that the wavelength selecting wavelength plate 101 can be sufficiently used as an optical device.

Example 2

An example of the wavelength selecting wavelength plate 105 according to the invention will be described with reference to FIGS. 4 and 5. There is fabricated a wave plate functioning as a ¼ wave plate for linearly polarized lights having wavelengths of 400 nm and 785 nm and serving to transmit a linearly polarized light having a wavelength of 660 nm with the polarizing state maintained.

(1) There is prepared the transparent substrate 10 to be a glass substrate having a thickness of 0.5 mm. A polyimide film is formed on a surface at an incident side of the transparent substrate 10 and an upper surface of the polyimide film is rubbed to give a horizontal alignment function to the polyimide film, thereby forming the alignment film 9. Furthermore, beads formed of $SiO_2$ and having a diameter of 32 μm which are not shown are sprayed on the alignment film 9 at a density of 5000 pieces/cm$^2$. By regulating a bead diameter, it is possible to control an optical rotating angle.

(2) There is prepared a glass substrate having the same polyimide alignment film (not shown) as the transparent substrate 10 on which the alignment film 9 is formed. The polyimide alignment film of the glass substrate having the polyimide alignment film is subjected to a mold releasing treatment. Furthermore, a thermosetting type epoxy sealing material which is not shown is printed on an outer peripheral portion of the glass substrate having the polyimide alignment film. The transparent substrate 10 and the glass substrate having the polyimide alignment film which is subjected to the mold releasing treatment are opposed to each other and are fixed through the epoxy sealing material to form a liquid crystal cell having a gap of 32 μm between two glass substrates.

(3) There is injected, into the liquid crystal cell, a liquefied cholesteric liquid crystal material having a difference Δn between a refractive index of an ordinary ray and a refractive index of an extraordinary ray which is approximately 0.117 with respect to a light having a wavelength of 400 nm, is approximately 0.105 with respect to a light having a wavelength of 660 nm and is approximately 0.103 with respect to a light having a wavelength of 785 nm, and having a cholesteric pitch of 370 nm. The cholesteric liquid crystal material is a UV curing liquid crystalline monomer composition having 1% of benzoylisopropyl ether added as a photopolymerization initiator.

(4) A UV light having a wavelength of 365 nm is irradiated on the whole liquid crystal material and the whole liquid crystalline monomer composition is polymerized and solidified in a horizontal alignment state. A heat treatment is carried out for 30 minutes at 140° C. to form the optical rotating material layer 8 which has a thickness of 32 μm and is horizontally aligned. An optical rotating direction of the optical rotating material layer 8 is reverse to that of the optical rotating material layer 1 in the [Example 1]. Then, the glass substrate subjected to the mold releasing treatment is removed so that the optical rotating plate 104 is finished.

(5) A UV adhesive is dropped onto a surface at the emitting side of the wavelength selecting wavelength plate 101 to carry out a rotation for 20 seconds at a rotating speed of 1000 rpm and 100 seconds at a rotating speed of 5000 rpm, thereby setting a thickness of a UV adhesive layer to be 5 µm. After the optical rotating plate 104 is laminated, a UV light of 5000 mJ is irradiated on the UV adhesive layer and the UV adhesive layer is thus cured into the bonding layer 11 so that the wavelength selecting wavelength plate 105 is finished.

INDUSTRIAL APPLICABILITY

As described above, the wavelength selecting wavelength plate and the optical head using the same according to the invention have an advantage that a desirable phase difference can be given to linearly polarized lights having at least two wavelengths, and can be applied to an optical head device using laser beams having at least two wavelengths.

The invention claimed is:

1. A wavelength selecting wavelength plate for providing selective polarizations to a first linearly polarized light group containing at least a linearly polarized light having a first wavelength, and a second linearly polarized light group containing at least a linearly polarized light having a second wavelength which is different from the first wavelength, the wavelength selecting wavelength plate comprising:

a first optical rotating plate having an optical rotating material layer formed by a cholesteric liquid crystal, wherein the first optical rotating plate converts an incident polarizing direction of the first linearly polarized light group into a first polarizing direction, and converts an incident polarizing direction of the second linearly polarized light group into a second polarizing direction; and a phase plate which converts light having the first polarizing direction into a circularly polarized light, and which does not effect a phase difference to light having the second polarizing direction, the phase plate being provided on a first surface side of the first optical rotating plate and having first and second birefringent material layers, the first birefringent material layer being closer to the first surface than the second birefringent material layer and having a first retardation value which is greater than a second retardation value of the second birefringent material layer, wherein the first and second birefringent material layers are formed such that their respective slow axes cross each other to form an angle of 45 to 75 degrees, and a ratio of the first retardation value to the second retardation value is from 1.8 to 2.2, whereby, when the first linearly polarized light group containing at least the linearly polarized light having the first wavelength, and the second linearly polarized light group containing at least the linearly polarized light having the second wavelength which is different from the first wavelength, pass through the first optical rotating plate and then through the phase plate in sequence, the first linearly polarized light group is given a phase change which is different from a phase change given to the second linearly polarized light group.

2. The wavelength selecting wavelength plate according to claim 1, further comprising a second optical rotating plate having an optical rotating material layer formed by a cholesteric liquid crystal, wherein:

the second optical rotating plate is provided on a side of the phase plate which is opposite to a side where the first optical rotating plate is provided.

3. The wavelength selecting wavelength plate according to claim 1, wherein:

the birefringent material layer of the phase plate is formed by a resin having a birefringent property.

4. An optical head device comprising:

at least one light source configured to emit light having different wavelengths;

an objective lens configured to collect the light emitted from the light source onto an optical recording medium; and a photodetector configured to detect a light reflected by the optical recording medium, wherein the wavelength selecting wavelength plate according to claim 1 is disposed in an optical path between the light source and the objective lens.

5. The wavelength selecting wavelength plate according to claim 1, wherein:

the first linearly polarized light group includes a linearly polarized light having a wavelength of 400 nm and a linearly polarized light having a wavelength of 785 nm; and the second linearly polarized light group includes a linearly polarized light having a wavelength of 660 nm.

* * * * *